United States Patent
Oldham

(10) Patent No.: US 8,433,441 B2
(45) Date of Patent: Apr. 30, 2013

(54) FUEL DISPENSER HAVING FM TRANSMISSION CAPABILITY FOR FUELING INFORMATION

(75) Inventor: Christopher Adam Oldham, High Point, NC (US)

(73) Assignee: Gilbarco Inc., Greensboro, NC (US)

( * ) Notice: Subject to any disclaimer, the term of this patent is extended or adjusted under 35 U.S.C. 154(b) by 64 days.

(21) Appl. No.: 13/180,905

(22) Filed: Jul. 12, 2011

(65) Prior Publication Data

US 2013/0018504 A1    Jan. 17, 2013

(51) Int. Cl.
G06F 17/00    (2006.01)

(52) U.S. Cl.
USPC ............ 700/236; 700/231; 700/232; 700/241

(58) Field of Classification Search .................. 700/231, 700/232, 236, 241
See application file for complete search history.

(56) References Cited

U.S. PATENT DOCUMENTS

| | | | |
|---|---|---|---|
| 3,984,032 A * | 10/1976 | Hyde et al. ....................... 222/26 |
| 4,918,425 A * | 4/1990 | Greenberg et al. ........ 340/539.3 |
| 4,977,528 A | 12/1990 | Norris |
| 5,319,545 A | 6/1994 | McGarvey et al. |
| 5,400,253 A | 3/1995 | O'Connor |
| 5,423,457 A | 6/1995 | Nicholas et al. |
| 5,689,071 A | 11/1997 | Ruffner et al. |
| 5,734,851 A | 3/1998 | Leatherman et al. |
| 5,890,520 A | 4/1999 | Johnson, Jr. |
| 5,956,259 A | 9/1999 | Hartsell, Jr. et al. |
| 5,969,691 A | 10/1999 | Myers |
| 6,026,868 A | 2/2000 | Johnson, Jr. |
| 6,052,629 A | 4/2000 | Leatherman et al. |
| 6,073,840 A | 6/2000 | Marion |
| 6,089,284 A | 7/2000 | Kaehler et al. |
| 6,098,879 A | 8/2000 | Terranova |
| 6,157,871 A | 12/2000 | Terranova |
| 6,184,846 B1 * | 2/2001 | Myers et al. .................. 343/895 |
| 6,263,319 B1 | 7/2001 | Leatherman |
| 6,313,737 B1 | 11/2001 | Freeze et al. |
| 6,343,241 B1 | 1/2002 | Kohut et al. |
| 6,363,299 B1 | 3/2002 | Hartsell, Jr. |
| 6,381,514 B1 | 4/2002 | Hartsell, Jr. |
| 6,422,464 B1 | 7/2002 | Terranova |
| 6,435,204 B2 | 8/2002 | White et al. |
| 6,446,049 B1 * | 9/2002 | Janning et al. .................. 705/40 |
| 6,466,842 B1 | 10/2002 | Hartsell, Jr. |

(Continued)

OTHER PUBLICATIONS

International Search Report and Written Opinion of corresponding Application No. PCT/US2012/046132 mailed Sep. 25, 2012.

*Primary Examiner* — Michael K Collins
(74) *Attorney, Agent, or Firm* — Nelson Mullins Riley & Scarborough LLP

(57) ABSTRACT

A fuel dispenser is configured to transmit fueling information to a receiver associated with a vehicle at a first fueling position adjacent the fuel dispenser. The fuel dispenser comprises a control system configured to generate first fueling information associated with a first transaction at the fuel dispenser. The fuel dispenser also comprises first transmitter electronics in electronic communication with the control system. The first transmitter electronics are configured to produce first RDS information based on the first fueling information. Also, the first transmitter electronics comprise modulator circuitry to modulate a radio frequency (RF) carrier signal carrying the first RDS information. The RF carrier signal has a predetermined frequency. The fuel dispenser further comprises an antenna in electrical communication with the first transmitter electronics to radiate the modulated RF carrier signal over the first fueling position for receipt at the vehicle receiver.

23 Claims, 7 Drawing Sheets

U.S. PATENT DOCUMENTS

| | | |
|---|---|---|
| 6,470,233 B1 | 10/2002 | Johnson, Jr. |
| 6,522,947 B1 | 2/2003 | Hartsell, Jr. |
| 6,571,151 B1 | 5/2003 | Leatherman |
| 6,574,603 B1 | 6/2003 | Dickson et al. |
| 6,618,362 B1 | 9/2003 | Terranova |
| 6,710,701 B2 | 3/2004 | Leatherman |
| 6,810,304 B1 | 10/2004 | Dickson |
| 6,813,609 B2 | 11/2004 | Wilson |
| 6,882,900 B1 | 4/2005 | Terranova |
| 6,912,503 B1 | 6/2005 | Quarendon et al. |
| 6,935,191 B2 | 8/2005 | Olivier et al. |
| 7,020,541 B2 | 3/2006 | Wilson |
| 7,027,890 B2 | 4/2006 | Wilson |
| 7,289,877 B2 | 10/2007 | Wilson |
| 7,587,170 B1 | 9/2009 | Lee et al. |
| 7,596,351 B2 | 9/2009 | Felder |
| 7,711,348 B2 | 5/2010 | Altizer |
| 7,716,082 B1 | 5/2010 | Blalock |
| 7,907,680 B2 | 3/2011 | Tsai et al. |
| 7,917,130 B1 | 3/2011 | Christensen et al. |
| 7,970,446 B2 | 6/2011 | Witkowski et al. |
| 8,183,995 B2 * | 5/2012 | Wang et al. ............... 340/539.1 |
| 2002/0046117 A1 | 4/2002 | Marion |
| 2007/0281644 A1 | 12/2007 | Olgen |
| 2008/0080682 A1 * | 4/2008 | Ogunwale et al. ......... 379/93.17 |
| 2008/0255888 A1 | 10/2008 | Berkobin et al. |
| 2009/0048707 A1 | 2/2009 | DeLine |
| 2009/0054020 A1 | 2/2009 | Mason |
| 2011/0130916 A1 * | 6/2011 | Mayer ............................ 701/33 |

* cited by examiner

FUEL DISPENSER HAVING FM TRANSMISSION CAPABILITY FOR FUELING INFORMATION

FIELD OF THE INVENTION

The present invention relates generally to fuel dispensers. More particularly, the invention relates to transmission of fueling information from a fuel dispenser to a receiver in a customer's vehicle using an FM signal carrying information encoded in accordance with the radio data system (RDS) standard or a similar standard.

BACKGROUND OF THE INVENTION

As is well known, fuel dispensers typically comprise one or more displays which provide information to a customer dispensing fuel. Such information may include the price per unit of fuel, the fuel grade, the total volume of the transaction, and the total price of the transaction. Additional information provided to a customer on the display may include advertising, merchandising, and/or multimedia presentations.

For various reasons, including the expense of hiring one or more attendants, retail service stations in many Western nations increasingly offer fuel to customers only in a "self-service" arrangement, meaning that customers must dispense fuel themselves. However, service stations in developing nations often offer fuel to customers only in a "full-service" arrangement, wherein attendants dispense fuel for the customers while the customers remain in their vehicles. In these latter, attendant-operated arrangements, an attendant may provide a customer with a handheld device that is in electronic communication with the fuel dispenser. This device may allow the customer to view information about the fueling transaction while the customer remains in his or her vehicle. These devices may be wired to the dispenser or may communicate wirelessly with the dispenser using the Bluetooth or ZigBee communication standards.

These handheld devices, however, present several problems for operators of retail service stations. For example, because such devices are custom made for a single purpose they can be expensive to purchase and implement. Further, customers may accidentally (or intentionally) drive away without returning the devices. Also, the high transaction volume at many service stations results in constant use of and damage to the devices, which may require their frequent replacement.

SUMMARY

The present invention recognizes and addresses disadvantages of prior art constructions and methods. According to one embodiment, the present invention provides a fuel dispenser configured to transmit fueling information to a receiver associated with a vehicle at a first fueling position adjacent the fuel dispenser. The fuel dispenser comprises a control system configured to generate first fueling information associated with a first transaction at the fuel dispenser. The fuel dispenser also comprises first transmitter electronics in electronic communication with the control system. The first transmitter electronics are configured to produce first RDS information based on the first fueling information. Also, the first transmitter electronics comprise modulator circuitry to modulate a first radio frequency (RF) carrier signal so as to carry the first RDS information. The RF carrier signal has an initial predetermined frequency. The fuel dispenser further comprises an antenna in electrical communication with the first transmitter electronics to radiate the modulated first RF carrier signal over the first fueling position for receipt at the vehicle receiver.

According to a further embodiment, the present invention provides transmitter electronics for transmitting fueling information from a fuel dispenser to a receiver associated with a vehicle at a fueling position adjacent the fuel dispenser. The transmitter electronics comprise an RDS encoder configured for electronic communication with a control system of the fuel dispenser for encoding RDS information based on fueling information received from the control system. The transmitter electronics further comprise oscillator circuitry to produce an RF carrier signal and modulator circuitry to modulate the RF carrier signal using an RDS subcarrier signal carrying the RDS information. The modulator circuitry is configured for electronic communication with an antenna of the fuel dispenser to radiate the modulated RF carrier signal over the fueling position for receipt at the vehicle receiver. In some embodiments, the field strength may be no greater than 250 µV/m when measured three meters from the antenna.

According to a further embodiment, the present invention provides a method for transmitting fueling information from a fuel dispenser to a receiver associated with a vehicle at a fueling position adjacent the fuel dispenser. First, the method comprises providing fueling information associated with a transaction at the fuel dispenser to transmitter electronics of the fuel dispenser. Then, RDS information is encoded based on the fueling information. The method further comprises modulating an RF carrier signal using an RDS subcarrier signal carrying the RDS information. Finally, the method comprises radiating from an antenna of the fuel dispenser the modulated RF carrier signal over the fueling position for receipt at the vehicle receiver.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
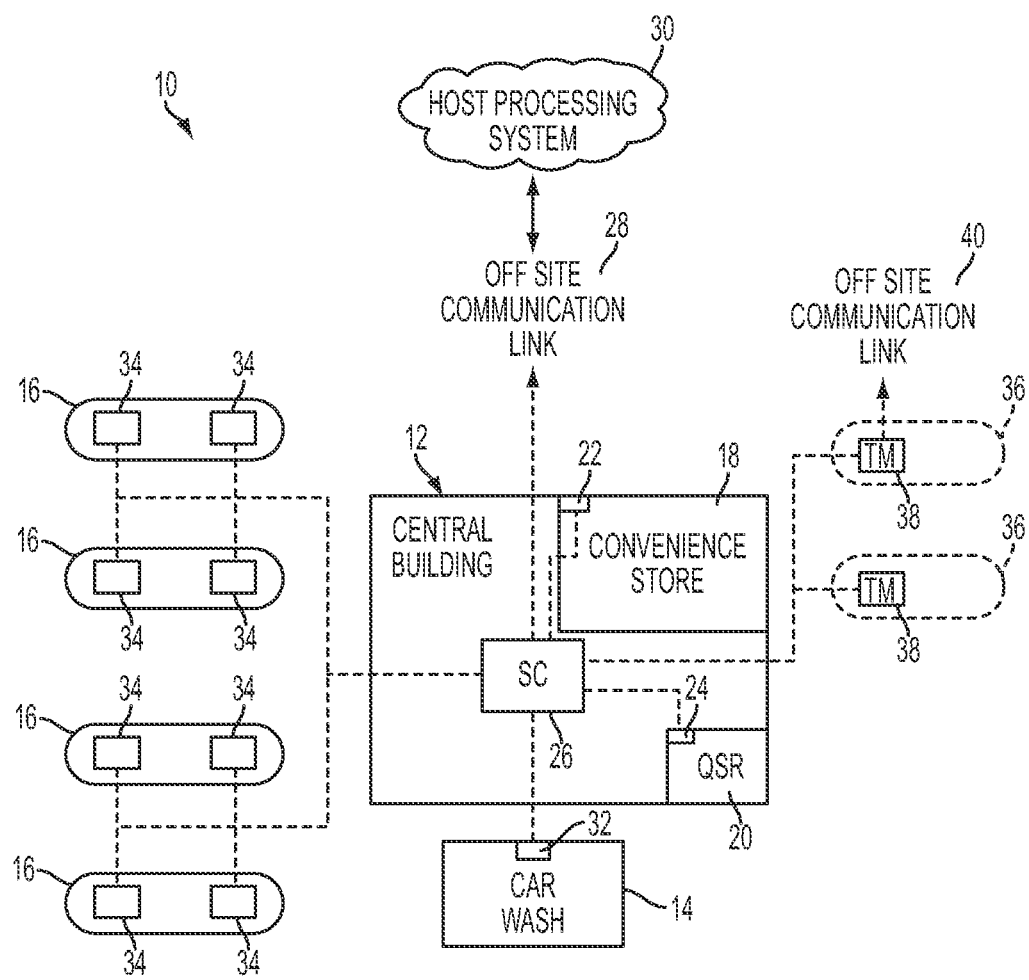
FIG. 1 is a diagrammatic representation of a retail fuel dispensing environment in which an embodiment of the present invention may be utilized.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention provide for transmission of fueling information from transmitter electronics in a fuel dispenser to a "radio" (i.e., receiver) associated with a vehicle adjacent the fuel dispenser. Preferably, the fueling information is encoded as RDS information prior to transmission via an RF carrier wave. After receiving and demodulating the RF carrier wave, the receiver may decode the RDS information to display alphanumeric text representative of the fueling information on a user interface. Thus, a customer may remain in his or her car during a fueling transaction and still view the fueling information for reference or verification purposes. The need to provide the customer with a specialized unit to view the fueling information is eliminated.

The baseband signal used to modulate a conventional radio carrier signal may include several types of information which may be received and processed at a suitable receiver, such as a vehicle's radio receiver. For example, the baseband signal may include a pilot tone, either stereophonic or monophonic audio, and RDS information. RDS is a communication standard promulgated by the International Electrotechnical Commission (IEC) for transmitting RDS information using radio carrier signals. The corresponding U.S. standard, which is very similar to RDS, is known as Radio Broadcast Data System (RBDS).

In a typical implementation of RDS, a subcarrier signal in the range of 54.6 kHz to 59.4 kHz containing RDS information may be multiplexed with a stereo audio signal in the range of approximately 23 kHz to approximately 53 kHz and a pilot tone at approximately 19 kHz, then transmitted to users via frequency modulation (FM) or amplitude modulation (AM). The RDS signal may contain information such as the name of the transmitting radio station, the type of program playing, the name of the artist currently playing, and/or information regarding traffic. The signal carries data at a rate of 1187.5 bits/second.

A receiver may receive, demodulate, and process the radio carrier signal to extract the RDS and audio signals. Suitable RDS signal processing circuitry may extract the RDS information from the RDS signal for display as text on a suitable user interface, and audio signal processing circuitry may extract the audio for playback through speakers or the like. Many commercially-available consumer vehicles include radios capable of demodulating and displaying RDS information on an alphanumeric display.

As used herein, the term "RDS information" broadly refers to information that is transmitted in accordance with the RDS standard, the RBDS standard, or any similar standard or system used to convey information using a radio frequency carrier signal (e.g., the Autofahrer-Rundfunk-Informationssystem (ARI), the Data Radio Channel (DARC) standard, or the DirectBand system). For example, in some embodiments, RDS information may be representative of fueling information. However, RDS information may also include codes which correspond to applications of the RDS or RBDS systems (e.g., program identification (PI), group type, program type (PTY), alternative frequencies (AF), and traffic program identification (TP)). The term "fueling information" is used herein to describe any information which corresponds to fueling transaction, including but not limited to the price of fuel dispensed, the amount of fuel dispensed, the price per unit of volume measured, a preset fuel volume, a preset price, and fuel characteristic information. Thus, in some cases, fueling information may be analogous to the information traditionally displayed on a user interface of a fuel dispenser. Fuel characteristic information may include information regarding fuel quality, density, and temperature for standard fuels as well as information regarding fuel pressure and temperature for compressed natural gas (CNG). The present invention also contemplates that the RDS information may include promotional information. Such promotional information may include advertising or merchandising messages or the like. Further, a "radio-frequency (RF) carrier signal" includes, but is not limited to, AM and FM signals, satellite signals, cable signals, or any other radio signal suitable for carrying RDS information.

Some embodiments of the present invention are particularly suitable for use with a fuel dispenser in a retail service station environment, and the below discussion will describe preferred embodiments in that context. However, those of skill in the art will understand that the present invention is not so limited. In fact, it is contemplated that the present invention be used with any appropriate fluid dispensing installation where it may be desirable to transmit information associated with a fluid dispensing transaction to a vehicle (or container) so that the operator may view the information in "real-time" such as while inside the vehicle. For example, embodiments of the present invention may also be used with diesel exhaust fluid (DEF) dispensers.

Referring now to FIG. 1, an exemplary fueling environment 10 may comprise a central building 12, a car wash 14, and a plurality of fueling islands 16. The central building 12 need not be centrally located within the fueling environment 10, but rather is the focus of the fueling environment 10, and may house a convenience store 18 and/or a quick serve restaurant 20 therein. Both the convenience store 18 and the quick serve restaurant 20 may include a point of sale (POS) 22, 24, respectively. POS 22, 24 may comprise a single computer or server operatively connected to an associated card reader and payment terminal. Additionally, POS 22, 24 may include a display, a touch screen, and/or other input devices.

The central building 12 may further house a site controller (SC) 26, which in an exemplary embodiment may be the PASSPORT® POS system, sold by Gilbarco Inc. of Greensboro, N.C., although third party site controllers may be used. Site controller 26 may control the authorization of fueling transactions and other conventional activities as is well understood, and site controller 26 may preferably be in operative communication with each POS. Alternatively, site controller 26 may be incorporated into a POS, such as point of sale 22 if needed or desired.

Further, site controller 26 may have an off-site communication link 28 allowing communication with a remote host processing system 30 for credit/debit card authorization, content provision, reporting purposes or the like, as needed or desired. In one embodiment, communication link 28 may be a stand alone router, switch, or gateway, although it should be appreciated that site controller 26 may additionally perform the functions of, and therefore replace, such a device. The off-site communication link 28 may be routed through the Public Switched Telephone Network (PSTN), the Internet, both, or the like, as needed or desired. Remote host processing system 30 may comprise at least one server maintained by a third party, such as a financial institution. Although only one remote host processing system 30 is illustrated, those of skill in the art will appreciate that in a retail payment system allowing payment via payment devices issued by multiple payment card companies or financial institutions, site controller 26 may be in communication with a plurality of remote host processing systems 30.

Car wash 14 may have a POS 32 associated therewith that communicates with site controller 26 for inventory and/or sales purposes. Car wash 14 alternatively may be a stand alone unit. Note that car wash 14, convenience store 18, and quick serve restaurant 20 are all optional and need not be present in a given fueling environment.

Fueling islands 16 may have one or more fuel dispensers 34 positioned thereon. Fuel dispensers 34 may be similar to, for example, the ENCORE® dispenser sold by Gilbarco Inc. of Greensboro, N.C. but modified in accordance with the present invention as described herein. Fuel dispensers 34 are in electronic communication with site controller 26 through any suitable link, such as two wire, RS 422, Ethernet, wireless, etc. as needed or desired.

Fueling environment 10 also has one or more underground storage tanks (USTs) 36 adapted to hold fuel therein. As such, USTs 36 may each be a double walled tank. Further, each UST 36 may include a tank monitor (TM) 38 associated therewith. Tank monitors 38 may communicate with fuel dispensers 34 (either through site controller 26 or directly, as needed or desired) to determine amounts of fuel dispensed and compare fuel dispensed to current levels of fuel within USTs 36 to determine if USTs 36 are leaking.

Tank monitor 38 may communicate with site controller 26 and further may have an off-site communication link 40 for leak detection reporting, inventory reporting, or the like. Much like off-site communication link 28, off-site communication link 40 may be through the PSTN, the Internet, both, or the like. If off-site communication link 28 is present, off-site communication link 40 need not be present and vice versa, although both links may be present if needed or desired.

Further information on and examples of fuel dispensers and retail fueling environments are provided in U.S. Pat. No. 6,435,204 (entitled "Fuel Dispensing System"); U.S. Pat. No. 5,956,259 (entitled "Intelligent Fueling"); U.S. Pat. No. 5,734,851 (entitled "Multimedia Video/Graphics in Fuel Dispensers"); U.S. Pat. No. 6,052,629 (entitled "Internet Capable Browser Dispenser Architecture"); U.S. Pat. No. 5,689,071 (entitled "Wide Range, High Accuracy Flow Meter"); U.S. Pat. No. 6,935,191 (entitled "Fuel Dispenser Fuel Flow Meter Device, System and Method"); and U.S. Pat. No. 7,289,877 (entitled "Fuel Dispensing System for Cash Customers"), all of which are incorporated herein by reference in their entireties for all purposes. An exemplary tank monitor 38 may be the TLS-450 manufactured and sold by the Veeder-Root Company of Simsbury, Conn. For more information about tank monitors and their operation, reference is made to U.S. Pat. No. 5,423,457 (entitled "Real time tank product loss detection system"); U.S. Pat. No. 5,400,253 (entitled "Automated Statistical Inventory Reconciliation System for Convenience Stores and Auto/truck Service Stations"); U.S. Pat. No. 5,319,545 (entitled "System to Monitor Multiple Fuel Dispensers and Fuel Supply Tank"); and U.S. Pat. No. 4,977,528 (entitled "Apparatus and Method for Determining the Amount of Material in A Tank"), all of which are incorporated by reference herein in their entireties for all purposes.

Figure 2:
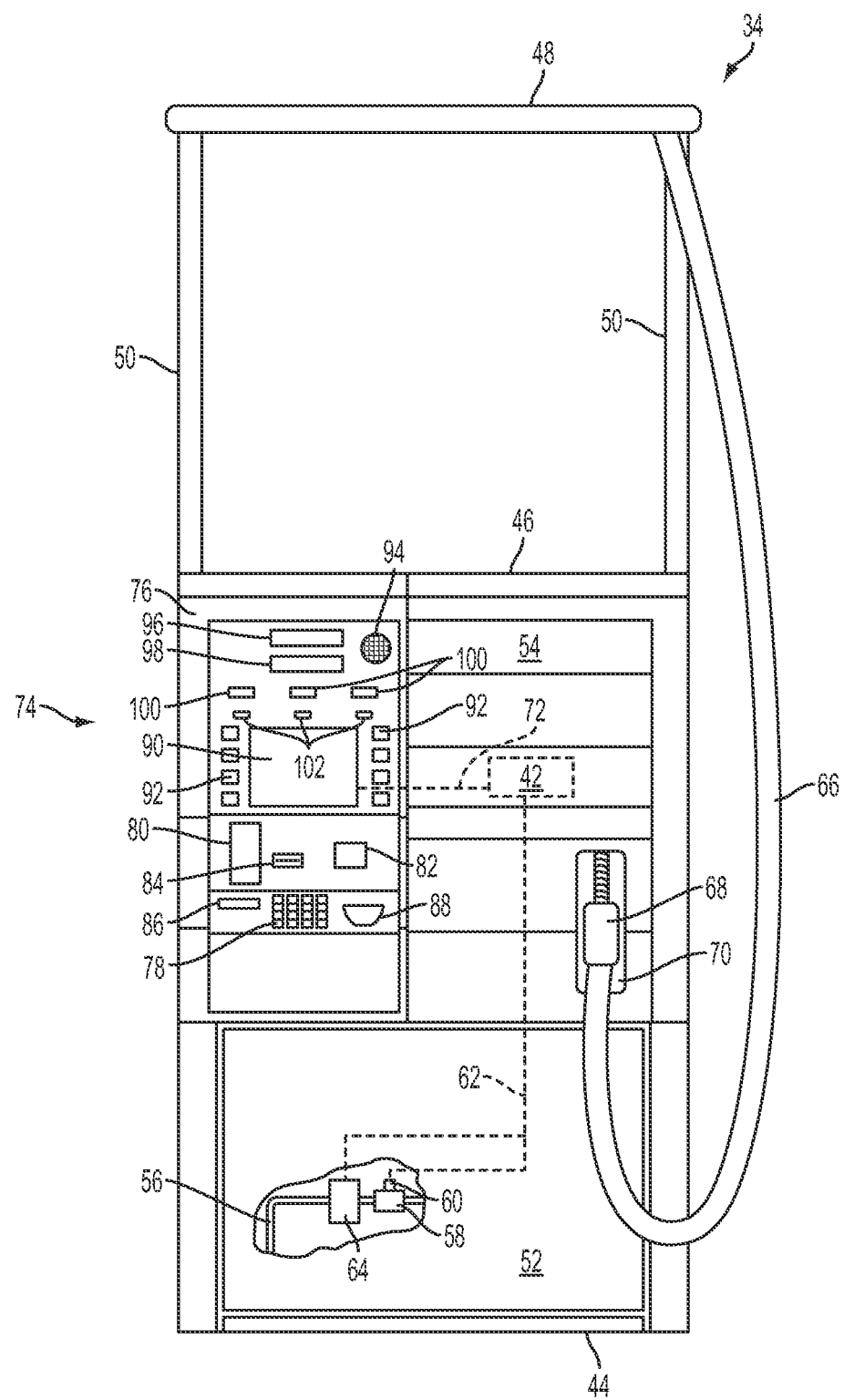
FIG. 2 is a front elevational view of an exemplary fuel dispenser that may operate within the retail fueling environment of FIG. 1.

FIG. 2 illustrates a fuel dispenser 34 that may operate in association with site controller 26 according to an embodiment of the present invention. Dispenser 34 includes a control system 42, which may be any suitable electronics with associated memory and software programs running thereon whether referred to as a processor, microprocessor, controller, microcontroller, or the like. In a preferred embodiment, control system 42 is comparable to the microprocessor-based control systems used in CRIND and TRIND type units sold by Gilbarco Inc. Control system 42 may be in operative communication with site controller 26 and controls various aspects of the fuel dispenser 34. Also, as described in more detail below, control system 42 may be in electronic communication with transmitter electronics located in fuel dispenser 34 to enable transmission of fueling information over one or more fueling positions adjacent dispenser 34.

The memory of control system 42 may be any suitable memory or computer-readable medium as long as it is capable of being accessed by the control system, including random access memory (RAM), read-only memory (ROM), erasable programmable ROM (EPROM), or electrically EPROM (EEPROM), CD-ROM, DVD, or other optical disk storage, solid-state drive (SSD), magnetic disc storage, including floppy or hard drives, any type of suitable non-volatile memories, such as secure digital (SD), flash memory, memory stick, or any other medium that may be used to carry or store computer program code in the form of computer-executable programs, instructions, or data. Control system 42 may also include a portion of memory accessible only to control system 42.

In the illustrated embodiment, dispenser 34 has a base 44 and a top 46, with a canopy 48 supported by two side panels 50. Fuel dispenser 34 is subdivided into multiple compartments. In this regard, a hydraulic area 52 encloses hydraulic components and an electronic area 54 encloses electronic components. A vapor barrier may be provided to separate the hydraulic area 52 from the electronic area 54.

Several components used to control fuel flow may be housed within the hydraulic area 52. Fuel from USTs 36 is pumped through a piping network into inlet pipe 56. Fuel being dispensed passes though a meter 58, which is responsive to flow rate or volume. A displacement sensor 60 (e.g., a pulser) is employed to generate a signal in response to fuel flow though the meter 58. Signals indicative of the flow of fuel being dispensed are provided to control system 42 via control/data lines 62. Control/data lines 62 provide control signaling to a valve 64 that may be opened and closed to permit or not permit dispensing of fuel.

Meter flow measurements from sensor 60 are collected by control system 42. Control system 42 also typically performs calculations such as cost associated with a fuel dispensing transaction. Additionally, control system 42 controls transactional processing at fuel dispenser 34 as will be described in more detail below.

As a dispensing transaction progresses, fuel is delivered to a hose 66 and through a nozzle 68 into the customer's vehicle. Dispenser 34 includes a nozzle boot 70, which may be used to hold and retain nozzle 68 when not in use. Nozzle boot 70 may include a mechanical or electronic switch to indicate when nozzle 68 has been removed for a fuel dispensing request and when nozzle 68 has been replaced, signifying the end of a fueling transaction. A control line provides a signaling path from the electronic switch to control system 42. Control system 42 may use signaling received via the control line in order to make a determination as to when a transaction has been initiated or completed.

Control/data lines 72 provide electronic communication between control system 42 and a user interface 74. User interface 74 includes various combinations of subsystems to facilitate customer interaction with dispenser 34 and acceptance of payment for dispensed fuel. A bezel 76 acts as a lip around the various subsystems of interface 74. In most cases, bezel 76 is flush with the face of the fuel dispenser; however, in some embodiments it may extend outwardly from the face, in effect forming a raised lip. Bezel 76 may also comprise a plurality of sections that frame or house various subsystems or components.

As shown, user interface 74 includes several input devices in this embodiment. For example, user interface 74 may include a keypad 78. Keypad 78 is typically used for entry of a PIN if the customer is using a debit card for payment of fuel or other goods or services. In a preferred embodiment, keypad 78 may be the FlexPay™ encrypting PIN pad offered by Gilbarco Inc. User interface 74 may also include a secure card reader 80 for accepting credit, debit, or other chip or magnetic stripe cards for payment. Additionally, secure card reader 80 may accept loyalty or program-specific cards.

User interface 74 may also include other input devices such as a contactless card reader 82 (e.g., for integrated circuit or "smart" cards). Further, user interface 74 may include other payment or transactional devices such as a bill acceptor 84, a receipt printer 86, and a change delivery device 88. Receipt printer 86 may provide a customer with a receipt of the transaction carried out at fuel dispenser 34. Change delivery device 88 may deliver change to a customer for overpayment. Other transactional devices, such as an optical reader and a biometric reader, are also contemplated.

A display 90 may be used to display information, such as transaction-related prompts and advertising, to the customer. In some embodiments, a touch screen may be used for display 90. In this case, display 90 may be configured to display a virtual keypad for receiving payment data such as a PIN of a debit card or the billing zip code of a credit card, for instance. Display 90 may also be used to receive a selection from the customer regarding the displayed information.

The customer may use soft keys 92 to respond to information requests presented to the user via the display 90. An intercom 94 may be provided to generate audible cues for the user and to allow the user to communicate with a supervisor or other person located in the central building. In addition, dispenser 34 may include a transaction price total display 96 that presents the user with the price for fuel that is dispensed. A transaction gallon (or liter) total display 98 may be used to present the user with the measurement of fuel dispensed in units of gallons or liters. Octane selection buttons 100 may be provided for the user to select which grade of fuel is to be dispensed before dispensing is initiated. Finally, price per unit (PPU) displays 102 may be provided to show the price per unit of fuel dispensed in either gallons or liters, depending on the programming of dispenser 34.

Figure 3:
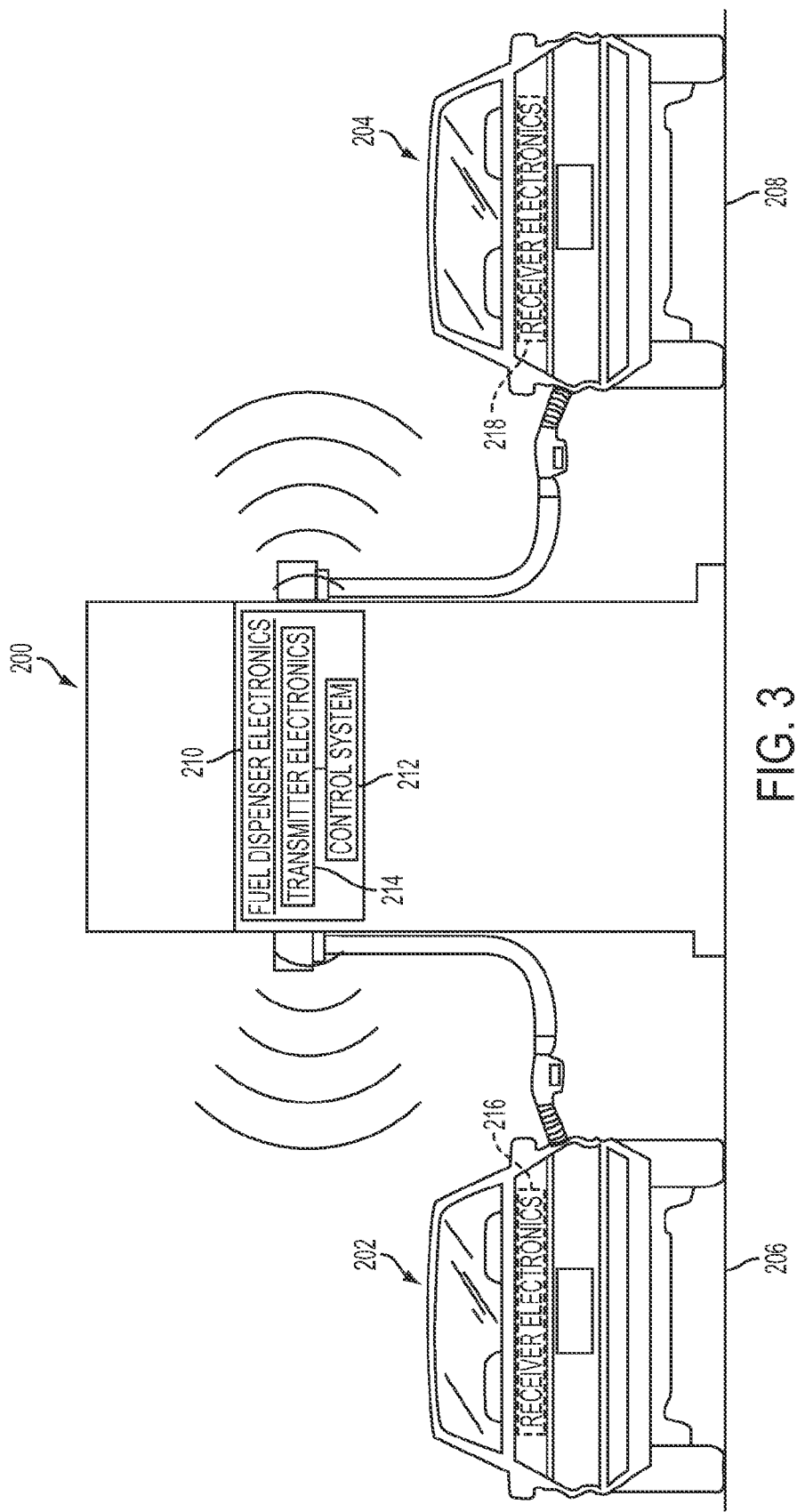
FIG. 3 is a schematic elevational view of a fuel dispenser configured to transmit fueling information to receiver electronics in two vehicles being refueled at the fuel dispenser according to an embodiment of the present invention.

As noted above, embodiments of the invention relate to transmitting fueling information to a receiver associated with a vehicle at a fueling position adjacent the fuel dispenser. In this regard, FIG. 3 is a schematic elevational view of a fuel dispenser 200 configured to transmit fueling information to receivers in two vehicles 202, 204 being refueled at fuel dispenser 200 according to an embodiment of the present invention. Vehicles 202, 204 may be positioned in fueling positions (also known as "lanes") 206, 208, respectively, which are adjacent dispenser 200.

Fuel dispenser 200, which in many respects may be similar or analogous to fuel dispenser 34, comprises fuel dispenser electronics 210. Fuel dispenser electronics 210, which includes a control system 212 (which is preferably analogous to control system 42), preferably includes some or all of the electronic components for fuel dispensing and transactional control described above. Notably, in this embodiment, fuel dispenser electronics 210 comprises transmitter electronics 214, which may be in electronic communication with control system 212. Fuel dispenser 34 may be a self-service or a full-service dispenser. One skilled in the art will appreciate that a fuel dispenser intended only for full service use may have a more simplified user interface than a self-service dispenser.

As described in more detail below, transmitter electronics 214 enable fuel dispenser 200 to transmit fueling information over fueling positions 206, 208 using RF carrier signals. The RF carrier signals may be received at receiver electronics 216, 218 associated with vehicles 202, 204, respectively. Receiver electronics 216, 218 may then demodulate the signals and display the fueling information on a user interface. In presently preferred embodiments, the fueling information for each transaction may be encoded as RDS information carried on an RDS subcarrier signal, which in turn may be used to modulate the RF carrier signals. Therefore, receiver electronics 216, 218 may comprise any receiver capable of receiving, processing, and displaying RDS data. Those of skill in the art will appreciate that many commercially available vehicles include AM/FM radios with RDS capability installed as standard equipment.

Figure 4:
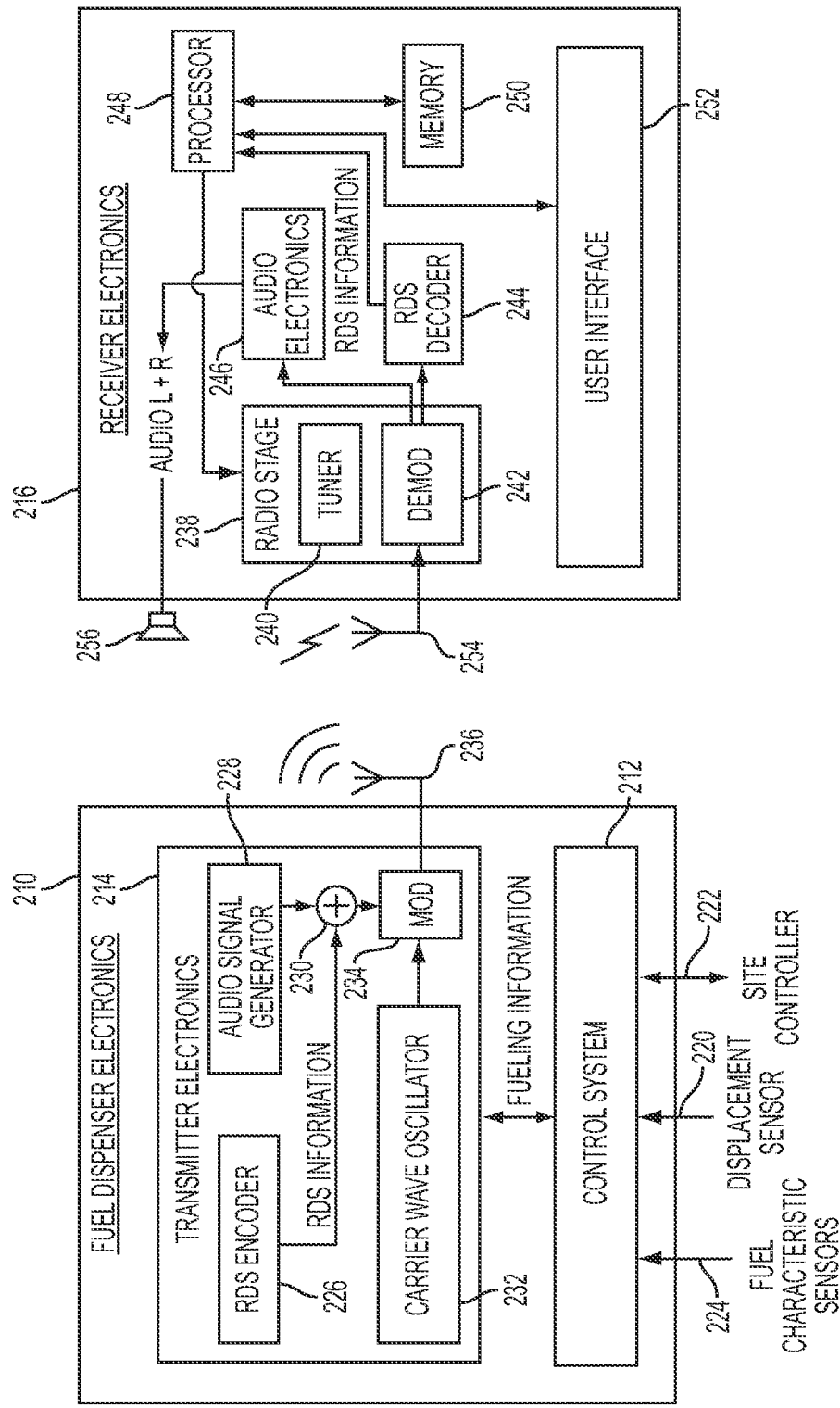
FIG. 4 is a block diagram illustrating the interaction between transmitter electronics of a fuel dispenser and receiver electronics of a vehicle according to an embodiment of the present invention.

FIG. 4 is a block diagram illustrating the operation of transmitter electronics 214 of fuel dispenser 200 and receiver electronics 216 of vehicle 202 according to an embodiment of the present invention. For the purpose of clarity, only receiver electronics 216 of vehicle 202 are presently described in detail. However, embodiments are contemplated wherein fueling information for separate transactions is transmitted simultaneously from fuel dispenser 200 to a respective one of receiver electronics 216 and 218. Typically, the transmitter electronics installed in fuel dispenser 200 will be adapted to transmit at different carrier frequencies for each of the respective fueling positions. In fact, all of the fuel dispensers in the fueling environment are preferably configured so that a separate frequency corresponds with every fueling position to reduce crosstalk and other interference.

In particular, similar to control system 42 described above, control system 212 may be in electronic communication with a displacement sensor 220 and a site controller 222. Control system 212 may also be in electronic communication with fuel characteristic sensors 224, such as sensors of fuel temperature, pressure, density, which are known to those of skill in the art. Control system 212 may use information received from displacement sensor 220, site controller 222, and fuel characteristic sensors 224 to compute or generate fueling information. For example, information from displacement sensor 220 (and, in some embodiments, a fuel temperature sensor) may be used to ascertain the amount of fuel dispensed and calculate the total price of fuel dispensed. Also, site controller 222 may transmit authorization and advertising or merchandising information to control system 212. Further, fuel characteristic sensors 224 may supply control system 212 with information regarding fuel pressure, temperature, and density. Any or all of the above information, among other types of fueling information, may be passed to transmitter electronics 214 for transmission. Preferably, control system 212 is programmable or configurable such that an operator of fuel dispenser 200 may determine which types, if any, of fueling information will be transmitted.

Transmitter electronics 214 may comprise an RDS encoder 226, an audio signal generator 228, multiplexer 230, a carrier wave oscillator 232, and modulator 234. Additionally, transmitter electronics 214 is in electrical communication with an antenna 236 of fuel dispenser 200. In some embodiments, such as where a single transmitter electronics 214 is used to transmit fueling information over two fueling positions, transmitter electronics 214 may be in electrical communication with more than one antenna 236. Alternatively, separate transmitter electronics 214, each in communication with an antenna 236, may be provided for each fueling position adjacent fuel dispenser 200. As shown, transmitter electronics 214 is separate from control system 212, but in some embodiments these elements may be combined.

RDS encoder 226 may be used to encode received fueling information into RDS information which is carried on an RDS subcarrier signal. Although the use of exemplary functions of the RDS (or RBDS) system as part of the RDS information is described in more detail below, in one example the fueling information may be encoded using the "Radio-Text" function. A commercially-available RDS encoder may include differential encoder circuitry, a biphase symbol generator, a digital-to-analog converter, pulse shaping circuitry, divider circuitry, oscillator circuitry (to generate the RDS subcarrier signal described above), and modulator circuitry.

According to a further embodiment, audio signal generator 228 may also use the received fueling information to produce an audio subcarrier signal carrying audio information representative of the fueling information. Thus, the audio subcarrier signal may be transmitted to and received at a vehicle's receiver and then the audio information may be output via the vehicle's speakers or sound system. This feature may be in addition to or in lieu of transmitting RDS information, and it will be appreciated that it may be useful for additional convenience or where a vehicle operator is not literate. In one embodiment, audio signal generator 228 may comprise voice synthesization software. Additionally, audio signal generator 228 may produce a pilot tone at approximately 19 kHz if receiver electronics 216 uses the pilot tone to demodulate received RDS information.

Multiplexer 230 may be used to multiplex onto a single channel the pilot tone, the RDS subcarrier signal carrying RDS information output from RDS encoder 226, and the audio signal output from audio signal generator 228. Carrier wave oscillator 232 may supply an RF carrier signal having a predetermined frequency, and modulator 234 may be used to modulate the RF carrier signal using the multiplexed signals output from RDS encoder 226 and audio signal generator 228.

Antenna 236 may be used to radiate over fueling position 206 the modulated RF carrier signal. (Those of skill in the art will appreciate that transmitter electronics 214 may include other well known transmitter circuitry elements prior to antenna 236, such as a power amplifier and impedance matching electronics.) Because fueling position 206 is adjacent fuel dispenser 200, the effective radiated power from antenna 236 may only need to be at a relatively low level. Still, to ensure the integrity of the data transmission, the effective radiated power is preferably high enough to minimize or prevent interference from stations or broadcasters transmitting on the same frequency in the general area of fuel dispenser 200.

Also, depending on the location of fuel dispenser 200, the frequencies at which the RF carrier signal is broadcast are preferably selected to minimize overlap with other local stations.

Notably, however, in some jurisdictions governmental regulations may limit the field strength of an intentionally-radiated signal where the radiator is not licensed by the government. As an example, the United States Federal Communications Commission regulations limit the field strength of RF energy from unlicensed intentional radiators to 250 µV/m when measured 3 meters from the radiator. 47 C.F.R. §15.239. Those of skill in the art can configure transmitter electronics 214 to comply with applicable governmental regulations, where necessary.

Receiver electronics 216 may comprise a typical RDS receiver already present in the customer's vehicle. Alternatively, an "off the shelf" portable radio having RDS capability may be used as receiver electronics 216. Moreover, receiver electronics 216 may also be incorporated into a handheld audio system (e.g., an mp3 player or the like), a GPS system, or any other suitable receiver. As shown, receiver electronics 216 may include radio stage 238 comprising a tuner 240 and demodulator 242, an RDS decoder 244, audio electronics 246, a processor 248, memory 250, and a user interface 252. Radio stage 238 may be in electrical communication with one or more antennas 254 and in some embodiments may comprise a dual tuner. Audio electronics 246 may be in electrical communication with existing speakers 256 installed in vehicle 202.

Demodulator 242, which may be analog or digital, may be used to demodulate an RF carrier signal received at antenna 254, for example based on a frequency to which the receiver is tuned. In particular, demodulator 242 extracts the audio subcarrier signal from the RF carrier signal. Audio electronics 246 may receive and process this audio signal, such as by decoding stereo sum and difference signals into right and left channel audio signals. These signals may then be passed to speakers 256 for output to a vehicle operator.

The output of demodulator 242 may also be received at RDS decoder 244. In particular, demodulator 242 may be used to extract the RDS subcarrier signal from the RF carrier signal. For example, in one embodiment, the pilot tone may be extracted from the demodulated RF carrier signal and used to form a 57 kHz subcarrier signal by clipping the pilot tone and extracting its third harmonic. The RDS signal may then be down-converted by the 57 kHz subcarrier signal.

RDS decoder 244 may be used to decode the received RDS signal into the RDS information previously transmitted. For example, in some embodiments, RDS decoder 244 may include demodulator circuitry, subcarrier recovery circuitry, a biphase symbol decoder, differential decoder circuitry, an analog-to-digital converter, and bit-rate clock recovery circuitry. RDS decoder 244 may provide the decoded RDS information to processor 248, which in some embodiments may store some or all of the RDS information in memory 250. Processor 248 may cause user interface 252 to display the RDS information as alphanumeric text. Thereby, the operator of vehicle 202 may view the RDS information (and thus the fueling information) in real-time while inside vehicle 202.

Figure 5:
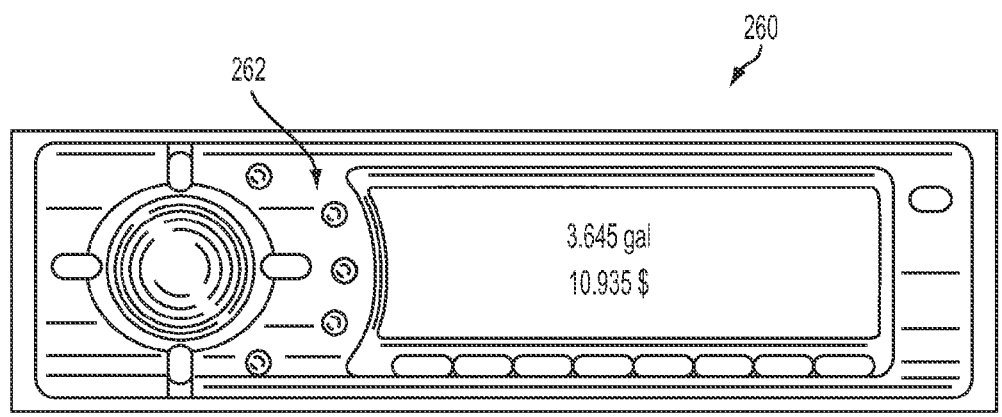
FIG. 5 is a front view of an exemplary vehicle receiver displaying fueling information on a user interface according to an embodiment of the present invention.

FIG. 5 shows an exemplary vehicle receiver 260 displaying fueling information on a user interface 262 according to an embodiment of the present invention. As shown, the operator of vehicle 202 can read that 3.645 gallons of fuel have been dispensed and that the price of this dispensed fuel is $10.935. In some embodiments, depending on the fueling information transmitted, the alphanumeric text displayed may scroll periodically or continuously across user interface 262 as new fueling information is generated and transmitted. In other embodiments, the alphanumeric text may remain stationary, with each digit or character changing as the transaction continues (much as the fueling information is displayed on traditional fuel dispenser transaction price or transaction gallon total displays).

RDS and RBDS standards define coding for a number of features which may be useful in association with certain aspects of the present invention. Generally, an encoded RDS signal contains a number of repeating "groups," each of which is composed of four, 26-bit "blocks." Each block comprises 16 bits of information and a 10-bit checkword for error correction. The first block is a "Program Identification" (PI) code, which includes a country code, a regional code, and an identifier of each individual radio program. This information enables a receiver to automatically search for an alternative frequency having the same PI code in case of bad reception of the program on the frequency to which the receiver is tuned.

The second block includes a group-type code and a group version code; these are used to identify the information content of the group. The second block also includes a "Traffic Program" (TP) identification code which identifies the transmitter as one which broadcasts traffic information. Finally, the second block includes a "Program Type" (PTY) code to describe the type of program being broadcast (e.g., Information, Sports, News, Classic Rock, etc.).

The information contained in the first and second blocks may typically reflect the type of information contained in the third and fourth blocks. The third and fourth blocks each provide 16-bits of data which can be used to send specific types of information to a receiver. For example, the group types 2A and 2B identify the RadioText function (mentioned above), in which the third and fourth blocks may be used to transmit a segmented, 64-character text message. Some radio stations may use this function to identify a particular radio program or the name of an artist or song playing. Group types 0A and 0B may be used to list one or more alternative frequencies (AF) on which transmitter electronics 214 may broadcast the RF carrier signal modulated with the RDS subcarrier signal. These group types may also include a "traffic announcement" (TA) identification code, which may indicate when a traffic announcement is on-air. This code may be used to cause a receiver to switch automatically from any audio mode or a program on one frequency to the frequency containing the traffic announcement. After the end of the traffic announcement, the receiver returns to its initial operating mode.

Further background regarding encoding of RDS and RBDS information is respectively provided in the RDS standard: IEC 62106 (2d ed. 2009), and the RBDS standard: National Radio Systems Committee standard 4-A (April 2005), each of which is incorporated by reference herein in its entirety for all purposes.

Figure 6:
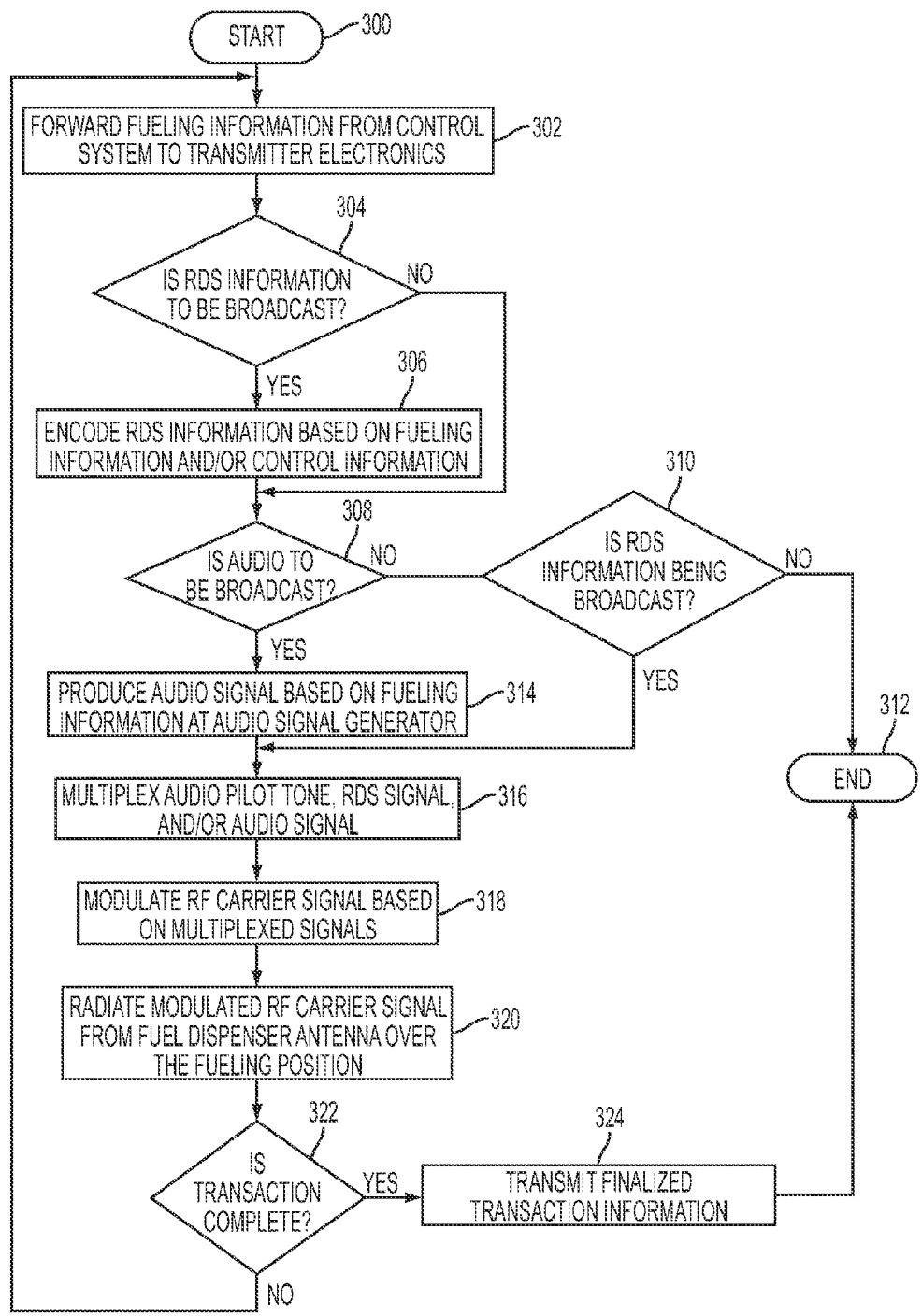
FIG. 6 is a flow chart illustrating a method of transmitting fueling information from a fuel dispenser according to an embodiment of the present invention.
Figure 7:
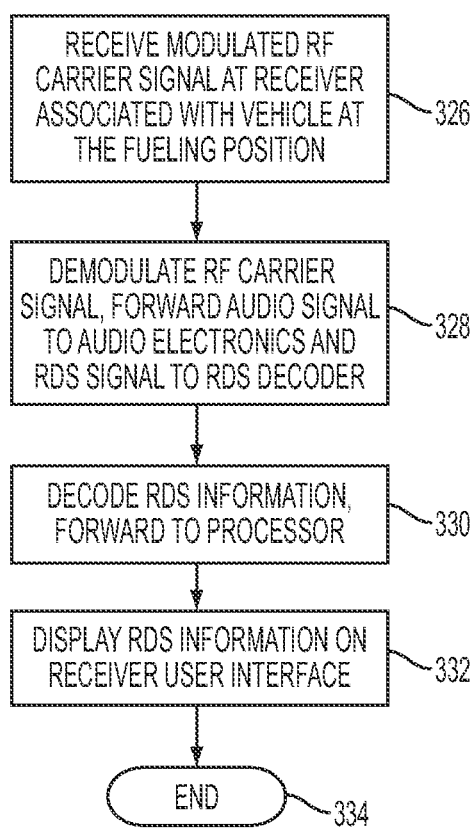
FIG. 7 is a flow chart illustrating a method of processing at a vehicle receiver a modulated RF carrier signal carrying fueling information encoded as RDS information according to an embodiment of the present invention.

The operation of one embodiment of the present invention is described with reference to FIGS. 6 and 7. FIG. 6 is a flow chart illustrating a method of transmitting fueling information from fuel dispenser 200. FIG. 7 is a flow chart illustrating a method of processing at the vehicle's receiver electronics 216 a modulated RF carrier signal carrying fueling information encoded as RDS information.

Referring first to FIG. 6, once a transaction is initiated at fuel dispenser 200 (e.g., by an attendant at a full-service station or the operator of vehicle 202), the process starts (step 300). When dispensing begins, control system 212 forwards fueling information to transmitter electronics 214 (step 302). As noted above, depending on the programming of dispenser electronics 210 (or, in some embodiments, the preference of the operator of vehicle 202), either or both of RDS information and audio information may be transmitted to fueling position 206 adjacent fuel dispenser 200 for receipt at vehicle 202.

Thus, control system 212 may first determine whether RDS information is to be broadcast (step 304). If so, transmitter electronics 214 may encode the fueling information into RDS information to be carried on an RDS subcarrier signal, as described above (step 306). Thereafter (or if the answer in step 304 was "No"), control system 212 may determine whether audio is to be broadcast (step 308). If not, control system 212 may refer to the answer to the question in step 304 (i.e., whether RDS information is to be broadcast) (step 310). If the answer here is again "No," the process ends (step 312). Referring back to step 308, if audio is to be broadcast in addition to RDS information, transmitter electronics 214 (via audio signal generator 228) may produce an audio signal based on the fueling information (step 314). Then, or if the answer in step 310 was "Yes," transmitter electronics 214 may multiplex the RDS signal, the audio signal, and a pilot tone (step 316) and modulate an RF carrier signal based on these multiplexed signals (step 318). The modulated RF carrier signal is then radiated over fueling position 206 via antenna 236 (step 320).

Finally, control system 212 may determine whether the fueling transaction is complete (step 322). If so, control system 212 may cause transmitter electronics 214 to transmit finalized transaction information (e.g., the total price or volume of fuel dispensed) for the customer's review (step 324). The process then ends (step 312). However, if the transaction is not complete, the process may be repeated. In particular, control system 212 may continue to forward updated fueling information to transmitter electronics 214 throughout the transaction. Thus, the operator of vehicle 202 may view fueling information in "real-time" from inside vehicle 202.

Referring now to FIG. 7, receiver electronics 216 of vehicle 202 may then receive the modulated RF carrier signal at antenna 254 (step 326). In particular, receiver electronics 216 may have previously been tuned (via tuner 240) to the predetermined frequency of the RF carrier signal. In this regard, an attendant at a full-service station or an instruction at fuel dispenser 200 may have instructed the operator as to the particular predetermined frequency. Alternatively, receiver electronics 216 may have automatically tuned to the predetermined frequency. In any case, receiver electronics 216 may then demodulate the RF carrier signal and forward the audio signal to audio electronics 246 and the RDS subcarrier signal to RDS decoder 244 (step 328). RDS decoder 244 may then decode the RDS information and forward it to processor 248 (step 330). Here, processor 248 may store any or all of the RDS information to memory 250. For example, processor 248 may store the PI code or a list of AF. Then, processor 248 may cause user interface 252 to display the RDS information as alphanumeric text (step 332) on user interface 252. Finally, the process ends (step 334).

As explained above, a retail fueling environment typically comprises a plurality of fuel dispensers, each of which may have two adjacent fueling positions. Thus, according to a further embodiment, each fuel dispenser in a fueling environment may transmit fueling information over its adjacent fueling positions for receipt at vehicle receivers. The information transmission may reflect a respective transaction associated with both fueling positions occurring simultaneously. To avoid interference, fueling information for each of the fueling positions in the retail fueling environment may be transmitted on a different frequency. Thus, each fuel dispenser may be assigned a predetermined frequency or a series of frequencies on which it may transmit fueling information to a particular fueling position. The customer may be notified of the predetermined frequency by a message on a fuel dispenser display or on its bezel or by a fueling attendant.

Alternatively, the transmitting frequencies may not be preassigned (i.e., static), but rather dynamically assigned on a transaction-by-transaction basis. In this case, a site controller (or other suitable central control system) may maintain a list of frequencies available for transmitting fueling information, assigning frequencies not in use to fuel dispensers where new transactions are initiated, and replacing on the list frequencies previously assigned to fuel dispensers where transactions have been completed. Additionally, the site controller may assign frequencies in a manner designed to minimize potential for interference, such as by not assigning frequencies in adjacent channels in the spectrum to dispensers spaced close together. In this embodiment, the assigned frequency to which a customer may tune his or her receiver may be included in a message on a fuel dispenser display or provided by an attendant.

Because the RDS information is transmitted using radio frequencies, it may be possible for a dishonest operator of a retail fuel dispensing site to attempt to defraud a customer by using an unauthorized transmitter. The unauthorized transmitter may be configured to interfere with and "overpower" the fuel dispenser's modulated RF carrier signal that contains accurate fueling information. Thereby, the unauthorized transmitter may cause inaccurate fueling information to be displayed on a customer's receiver. For example, a vehicle operator may desire to purchase 10 gallons of fuel. Although only 9 gallons have actually been dispensed, the unauthorized transmission may cause a vehicle's receiver to display that 10 gallons of fuel have been dispensed. The vehicle operator may thus overpay for this transaction.

Therefore, the fuel dispenser electronics may implement one or more security features to deter fraud. For example, referring again to FIG. 4, control system 212 may cause transmitter electronics 214 to change the frequency of the modulated RF carrier signal (preferably on a "random" basis) one or more times during a transaction. Because any unauthorized transmitter would not know the alternative frequency or pattern of frequencies, the unauthorized transmitter would not be able to interfere with the transmission of RDS information.

More particularly, in one embodiment, control system 212 may encode as part of the RDS information a list of one or more alternative frequencies as described above. Processor 248 of receiver electronics 216 may store these frequencies in memory 250. Control system 212 may then cause transmitter electronics 214 to switch the frequency at which the modulated RF carrier signal is broadcast at a predetermined time, a predetermined number of times, or randomly during a fueling transaction. Receiver electronics 216 may then detect that the modulated RF carrier signal is attenuated or no longer being broadcast on the initial frequency to which receiver electronics 216 is tuned. Accordingly, receiver electronics 216 may automatically switch to the new frequency of transmitter electronics 214 by selecting from memory 250 and tuning to the alternative frequency with the strongest signal.

In an alternative embodiment, the RDS information transmitted via the modulated RF carrier wave may include a unique program identification code that identifies the "program" transmitted from fuel dispenser 200, and processor 248 may store this information in memory 250. Control system 212 may again cause transmitter electronics 214 to switch frequencies one or more times during a transaction. After it detects that the signal on the initial frequency is attenuated, receiver electronics 216 may locate the new frequency by automatically scanning for and tuning to the frequency on which a signal is transmitted having the same program identification code as that stored in memory 250.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A fuel dispenser configured to transmit fueling information to a receiver associated with a vehicle at a first fueling position adjacent said fuel dispenser, said fuel dispenser comprising:
a control system configured to generate first fueling information associated with a first transaction at said fuel dispenser;
first transmitter electronics in electronic communication with said control system, said first transmitter electronics configured to produce first RDS information based on said first fueling information;
said first transmitter electronics comprising modulator circuitry to modulate a first radio frequency (RF) carrier signal so as to carry said first RDS information, wherein said RF carrier signal has an initial predetermined frequency; and
an antenna in electrical communication with said first transmitter electronics to radiate said first RF carrier signal over said first fueling position for receipt at said vehicle receiver.

2. The fuel dispenser of claim 1, wherein said first fueling information is representative of one of the group consisting of the price of fuel dispensed, the amount of fuel dispensed, the price per unit of volume measured, a preset fuel volume, a preset price, and fuel characteristic information.

3. The fuel dispenser of claim 1, wherein said first RDS information further includes promotional information.

4. The fuel dispenser of claim 1, wherein said first transmitter electronics further comprises an audio signal generator to produce an audio signal carrying information representative of said first fueling information for receipt at said vehicle receiver.

5. The fuel dispenser of claim 4, wherein said first transmitter electronics comprise a multiplexer to multiplex said audio signal and said RDS subcarrier signal, and wherein said modulator circuitry modulates said RF carrier signal using said multiplexed signal.

6. The fuel dispenser of claim 1, wherein said initial predetermined frequency of said RF carrier signal is between 87.5 MHz and 108.0 MHz.

7. The fuel dispenser of claim 6, wherein the field strength of said RF carrier signal is no greater than 250 µV/m when measured at three meters from said antenna.

8. The fuel dispenser of claim 6, wherein said first RDS information includes data representative of at least one alternative frequency on which an RF carrier signal modulated with said RDS subcarrier signal can be broadcast.

9. The fuel dispenser of claim 8, wherein said first transmitter electronics causes said antenna to radiate said RF carrier signal carrying said RDS information at said alternative frequency over said first fueling position during said first transaction.

10. The fuel dispenser of claim 6, wherein said first RDS information is configured to be read by a receiver associated with said vehicle to display alphanumeric text on a user interface of said receiver.

11. The fuel dispenser of claim 1, wherein said control system is configured to generate second fueling information associated with a second transaction at said fuel dispenser, said second transaction associated with a vehicle at a second fueling position adjacent said fuel dispenser.

12. The fuel dispenser of claim 11, further comprising second transmitter electronics in electronic communication with said control system, said second transmitter electronics configured to produce second RDS information based on said second fueling information and to modulate a second RF carrier signal carrying said second RDS information.

13. The fuel dispenser of claim 12, wherein said first transmitter electronics and said second transmitter electronics are the same.

14. The fuel dispenser of claim 12, further comprising an antenna in electrical communication with said second transmitter electronics to radiate over said second fueling position said second RF carrier signal carrying said second RDS information.

15. The fuel dispenser of claim 1, wherein said first RDS information is configured to cause said vehicle receiver to automatically tune to said predetermined frequency.

16. A method for transmitting fueling information from a fuel dispenser to a receiver associated with a vehicle at a fueling position adjacent said fuel dispenser, said method comprising the steps of:
    providing fueling information associated with a transaction at said fuel dispenser to transmitter electronics of said fuel dispenser;
    encoding RDS information based on said fueling information;
    modulating a radio frequency (RF) carrier signal using an RDS subcarrier signal carrying said RDS information; and
    radiating from an antenna of said fuel dispenser said modulated RF carrier signal over said fueling position for receipt at said vehicle receiver.

17. The method of claim 16, further comprising configuring said RDS information to be read by a receiver associated with said vehicle to display alphanumeric text representative of said fueling information on a user interface of said receiver.

18. The method of claim 16, further comprising generating audio signal information representative of said fueling information.

19. The method of claim 16, wherein said fueling information is representative of one of the group consisting of the price of fuel dispensed, the amount of fuel dispensed, the price per unit of volume measured, a preset fuel volume, a preset price, and fuel characteristic information.

20. The method of claim 16, further comprising radiating said RF carrier signal at a frequency between 87.5 MHz and 108.0 MHz.

21. The method of claim 20, wherein said RDS information includes data representative of at least one alternative frequency on which an RF carrier signal modulated with said RDS subcarrier signal can be broadcast.

22. The method of claim 20, further comprising radiating said RF carrier signal at a predetermined power level such that the field strength of said radiated RF carrier signal is less than or equal to 250 μV/m when measured at three meters from said antenna.

23. The method of claim 16, wherein said RDS information is configured to cause said vehicle receiver to automatically tune to said predetermined frequency.

* * * * *